US011057276B2

(12) United States Patent
Biran et al.

(10) Patent No.: US 11,057,276 B2
(45) Date of Patent: Jul. 6, 2021

(54) BULK SERVICE MAPPING

(71) Applicant: ServiceNow, Inc., Santa Clara, CA (US)

(72) Inventors: Noam Biran, Kfar Menachem (IL); Bnayahu Makovsky, Kiryat-Ono (IL)

(73) Assignee: ServiceNow, Inc., Santa Clara, CA (US)

( * ) Notice: Subject to any disclaimer, the term of this patent is extended or adjusted under 35 U.S.C. 154(b) by 169 days.

(21) Appl. No.: 15/928,869

(22) Filed: Mar. 22, 2018

(65) Prior Publication Data

US 2019/0104024 A1 Apr. 4, 2019

Related U.S. Application Data

(60) Provisional application No. 62/568,087, filed on Oct. 4, 2017.

(51) Int. Cl.
*H04L 12/24* (2006.01)
*H04L 12/26* (2006.01)
*H04L 29/08* (2006.01)

(52) U.S. Cl.
CPC ............ *H04L 41/12* (2013.01); *H04L 41/065* (2013.01); *H04L 41/0677* (2013.01);
(Continued)

(58) Field of Classification Search
CPC ... H04L 41/065; H04L 41/22; H04L 41/5032; H04L 41/5096; H04L 41/12; H04L 67/1029
(Continued)

(56) References Cited

U.S. PATENT DOCUMENTS 5,978,594 A 11/1999 Bonnell
6,321,229 B1 11/2001 Goldman
(Continued)

FOREIGN PATENT DOCUMENTS

WO 2013112288 A1 8/2013

OTHER PUBLICATIONS

IBM, "Handling errors in BPDs," IBM Knowledgecenter, Retrieved from the Internet: URL: https://www.ibm.com/support/knowledgecenter/en/SSFTBX_8.5.5/com.ibm.wbpm.wle.editor.doc/topics/cauth_handling_errors_bpds.html [retrieved on Aug. 9, 2017].
(Continued)

*Primary Examiner* — Tonia L Dollinger
*Assistant Examiner* — Jonathan A Sparks
(74) *Attorney, Agent, or Firm* — Fletcher Yoder PC

(57) ABSTRACT

Techniques related to bulk mapping network services are disclosed. The techniques include a system, comprising non-transitory memory devices, and hardware processors configured to execute instructions from the non-transitory memory devices to cause the system to determine a set of service entry point candidates for an organization based, at least in part, on network information received from load balancing servers, receive user input including a selection of a set of service entry points selected from the set of service entry point candidates, collect network information related to two or more service entry points of the set of service entry point candidates in parallel, the network information including returned errors associated with a respective service entry point, group the returned errors into category groups based on characteristics of the returned errors, and display the category groups on a display device for bulk resolution.

18 Claims, 9 Drawing Sheets

(52) U.S. Cl.
CPC .......... *H04L 41/22* (2013.01); *H04L 41/5032* (2013.01); *H04L 43/065* (2013.01); *H04L 67/10* (2013.01); *H04L 67/1029* (2013.01); *H04L 41/5096* (2013.01)

(58) Field of Classification Search
USPC ........................................................ 709/224
See application file for complete search history.

(56) References Cited

U.S. PATENT DOCUMENTS

| | | | |
|---|---|---|---|
| 6,609,122 B1 | 8/2003 | Ensor | |
| 6,658,650 B1 | 12/2003 | Bates | |
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,328,260 B1 * | 2/2008 | Muthiyan | H04L 41/0681 709/220 |
| 7,392,300 B2 | 6/2008 | Anantharangachar | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidari | |
| 7,930,396 B2 | 4/2011 | Trinon | |
| 7,941,506 B2 | 5/2011 | Bonal | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,200,803 B2 * | 6/2012 | Benfield | H04L 41/12 709/223 |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,706,667 B2 | 4/2014 | Stanfill et al. | |
| 8,743,121 B2 | 6/2014 | De Peuter | |
| 8,745,040 B2 | 6/2014 | Kowalski | |
| 8,799,609 B1 | 8/2014 | Bauer et al. | |
| 8,812,539 B2 | 8/2014 | Milousheff | |
| 8,818,994 B2 | 8/2014 | Kowalski | |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,497,136 B1 * | 11/2016 | Ramarao | G06F 9/45558 |
| 9,534,903 B2 | 1/2017 | Cline | |
| 9,535,737 B2 | 1/2017 | Joy | |
| 9,557,969 B2 | 1/2017 | Sharma | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 2006/0184410 A1 * | 8/2006 | Ramamurthy | G06Q 10/10 706/8 |
| 2013/0325789 A1 * | 12/2013 | Krishnan | G06F 16/254 707/602 |
| 2014/0047274 A1 * | 2/2014 | Lumezanu | G06F 11/3006 714/37 |
| 2016/0014073 A1 * | 1/2016 | Reddy | G06F 9/4416 713/2 |
| 2016/0034334 A1 | 2/2016 | Sadovsky et al. | |
| 2016/0162825 A1 * | 6/2016 | Dan | G06Q 10/06316 705/7.37 |
| 2016/0359680 A1 * | 12/2016 | Parandehgheibi | H04J 3/14 |
| 2018/0123939 A1 * | 5/2018 | Raman | H04L 47/828 |
| 2018/0176261 A1 * | 6/2018 | Bansal | H04L 41/0893 |

OTHER PUBLICATIONS

Extended European Search Report for European Patent Application No. 18198156.4 dated Feb. 26, 2019; 10 pgs.
First Examination Report for European Patent Application No. 18198156.4 dated Feb. 18, 2020; 8 pgs.

* cited by examiner

BULK SERVICE MAPPING

CROSS-REFERENCE TO RELATED APPLICATIONS

This application claims priority to U.S. Provisional Patent Application Ser. No. 62/568,087 filed Oct. 4, 2017, and entitled "Platform Computing Environment and Functionality Thereof," the contents of which are incorporated herein by reference.

TECHNICAL FIELD

Embodiments described herein generally relate to cloud computing and in particular to bulk service mapping.

BACKGROUND ART

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or automating enterprise operations without maintaining network infrastructure and/or allocating computing resources normally associated with these functions.

Within the context of automating enterprise, IT, and/or other organization-related functions (e.g., human resources (HR)), PaaS often provides users an array of tools to implement complex behaviors, such as enterprise rules, scheduled jobs, events, and scripts, to build automated processes and to integrate with third party systems. Although the tools for PaaS generally offer users a rich set of facilities for building automated processes for various enterprise, IT, and/or other organization-related functions, users typically implement custom scripts to perform the automated process. Requiring customized script to build automated processes may pose a challenge when attempting to address abstraction (e.g., providing domain-appropriate building blocks), code reuse (e.g., having defined application program interface (API) semantics), and/or codeless development. As such, continually improving the technology of developmental platforms that simplify the process for a user to design and run automated processes remains valuable in enhancing clouding computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

One embodiment includes a system for bulk mapping network services. The system determines a set of service entry point candidates for an organization based, at least in part, on network information received from one or more load balancing servers. The system receives user input including a selection of a set of service entry points selected from the set of service entry point candidates. The system collects network information related to two or more service entry points of the set of service entry point candidates in parallel, wherein the network information includes returned errors associated with a respective service entry point. The system groups the returned errors into one or more category groups based on characteristics of the returned errors. The system displays the one or more category groups on a display device for bulk resolution.

Another embodiment includes a method for bulk mapping network service. The method includes determining a set of service entry point candidates for an organization based, at least in part, on network information received from one or more load balancing servers. The method also includes receiving user input including a selection of a set of service entry points selected from the set of service entry point candidates. The method also includes collecting network information related to two or more service entry points of the set of service entry point candidates in parallel, wherein the network information includes returned errors associated with a respective service entry point. The method also includes grouping the returned errors into one or more category groups based on characteristics of the returned errors. The method also includes displaying the one or more category groups on a display device for bulk resolution.

Another embodiment includes a non-transitory computer readable medium containing instructions that, when executed by a processor causes a programmable device to perform a technique for bulk mapping. The instructions cause the programmable device to determine a set of service entry point candidates for an organization based, at least in part, on network information received from one or more load balancing servers. The instructions also cause the programmable device to receive user input including a selection of a set of service entry points selected from the set of service entry point candidates. The instructions also cause the programmable device to collect network information related to two or more service entry points of the set of service entry point candidates in parallel, wherein the network information includes returned errors associated with a respective service entry point. The instructions also cause the programmable device to group the returned errors into one or more category groups based on characteristics of the returned errors. The instructions also cause the programmable device to display the one or more category groups on a display device for bulk resolution.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
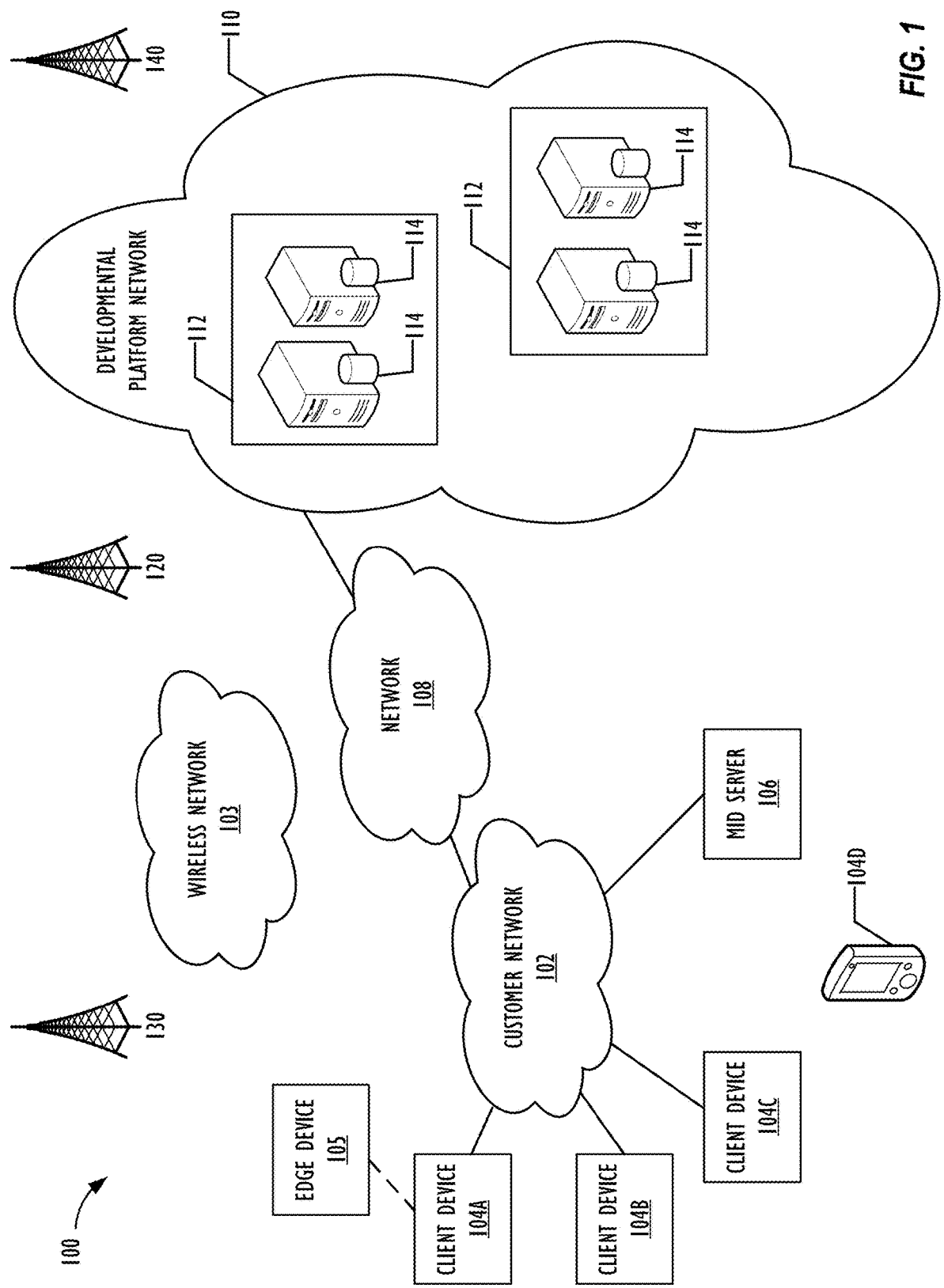
FIG. 1 illustrates a block diagram of an embodiment of a cloud computing system 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Service Management (SM), sometimes referred to as Enterprise Service Management, refers to a field of information technology (IT) administration that ties particular portions of an IT infrastructure (referred to as Configuration Items (CIs)) to a function provided by an enterprise. For example, an enterprise may be divided functionally into a set of services that the enterprise provides internally and externally. In a large enterprise there may be several Enterprise Units (EUs) and each EU may include one or more services. Examples of internal functions that support an enterprise include but are not limited to, human resources and finance. Examples of external functions that support an enterprise include but are not limited to, product delivery, logistics, e-commerce, and customer support. Obviously, some of these functions services have both internal and external components. One goal of SM is to identify what functions make up a service and, in turn, which CIs support those functions within the IT infrastructure. Having such a view may allow prioritization of IT tasks such as trouble shooting, upgrade, and maintenance in a manner that best supports overall goals of the enterprise. The view tying CIs to service functions may, for example, be represented in a visual graph or a mathematical model referred to as a service map or enterprise service map.

As mentioned above, CIs represent portions of an IT infrastructure. A portion of an IT infrastructure may be confined to an individual server, router, data storage unit, or other physical IT component. Alternatively, a portion of an IT infrastructure may be considered as a logical abstraction of a group of physical IT components providing a function, for example, a data base or web service. A data base containing employee records could then be included in a service map for one or more human resources functions of the enterprise (e.g., payroll, benefits, etc.). Similarly, a web service supporting e-commerce could be a CI included in a service map representing a customer facing web sales function.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) server 106 that facilitates communication of data between the developmental platform network 110, other external applications, data sources, and services, and the customer network 102. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network), wireless fidelity (WiFi® (WIFI is a registered trademark owned by Wi-Fi Alliance Corporation)) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 is a remote network (e.g., a cloud network) that is able to communicate with the client devices 104A-C via the customer network 102 and network 108. The developmental platform network 110 provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Each of the data center 112 includes a plurality of server instances 114, where each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules. An example of implementing a customer instance within a multi-instance cloud architecture will be discussed in more detail below when describing FIG. 2.

Figure 2:
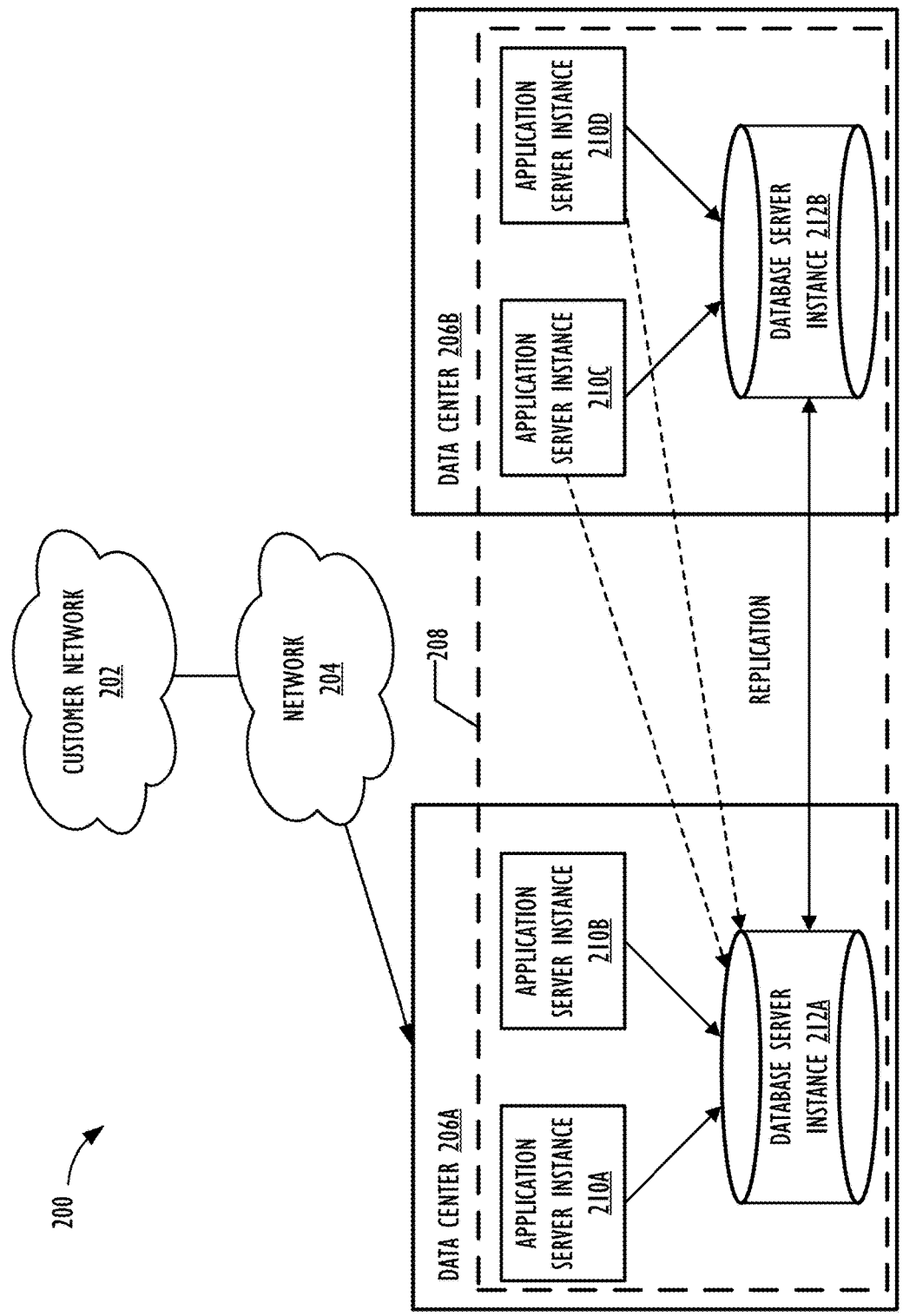
FIG. 2 illustrates a block diagram of an embodiment of a multi-instance cloud architecture 200 where embodiments of the present disclosure may operate.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within developmental platform network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, the application server instances 210a-210d and database server instances 212a and 212b are allocated to two different data centers 206a and 206b, where one of the data centers 206 acts as a backup data center. In reference to FIG. 2, data center 206a acts as a primary data center 206a that includes a primary pair of application server instances 210a and 210b and the primary database server instance 212a for the customer instance 208, and data center 206b acts as a secondary data center 206b to back up the primary data center 206a for a customer instance 208. To back up the primary data center 206a for the customer instance 208, the secondary data center 206 includes a secondary pair of application server instances 210c and 210d and a secondary database server instance 212b. The primary database server instance 212a is able to replicate data to the secondary database server instance 212b. As shown in FIG. 2, the primary database server instance 212a replicates data to the secondary database server instance 212b using a Master-Master MySQL Binlog replication operation. The replication of data between data could be implemented by performing full backups weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if the application server instances 210a and 210b and/or primary data server instance 212a fails and/or is under maintenance, data traffic for customer instances 208 can be diverted to the secondary application server instances 210c and 210d and the secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of remote network infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation and are not intended to limit the disclosure to the specific examples.

Figure 3:
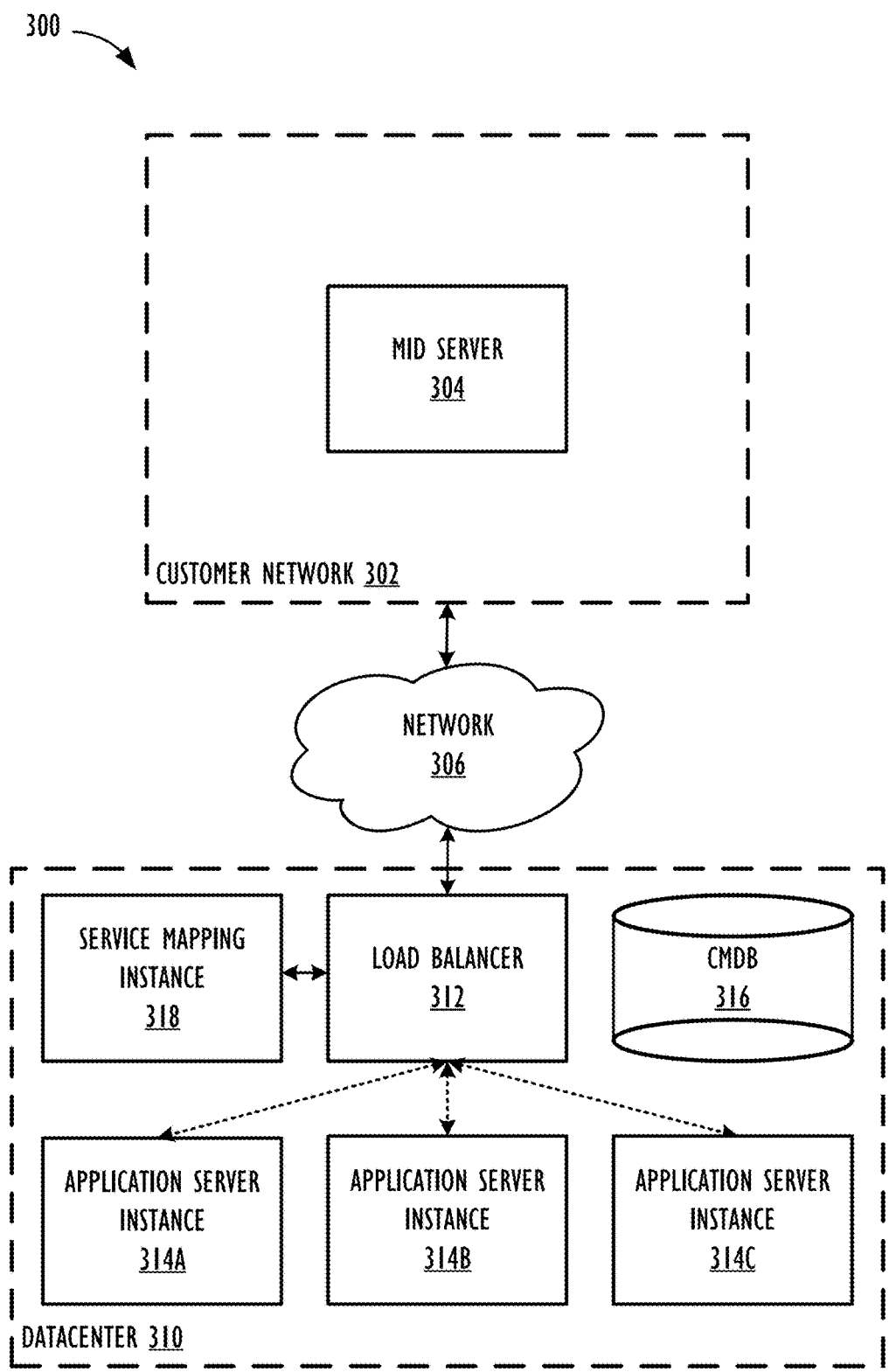
FIG. 3 is a schematic diagram of an embodiment of service mapping in a multi-instance cloud architecture 300, in accordance with aspects of the present disclosure.

FIG. 3 is a schematic diagram of an embodiment of service mapping in a multi-instance cloud architecture 300, in accordance with aspects of the present disclosure. The multi-instance cloud architecture 300 may include a customer network 302 with a MID server 304. Devices within the customer network 302, not shown, may communicates via network 306 with a datacenter 310 via one or more load balancers 312. Load balancers 312 allow a workload for a service to be spread across multiple application server instances 314A-314C by distributing the workload across the multiple application server instances 314A-314C. For example, a first query from the customer network 302 may be directed by the load balancers 312 to application server instance 314A, while a second query may be directed to application server instance 314C. In order to direct the workloads to the proper resources, the load balancers 312 may be configured with information indicating the network resources associated with a particular service. In certain cases, this information may, for example, be mapping tables of service IPs, web addresses, or ports to server addresses, ports or other logical abstractions. This information may be useful for determining the services in use by the enterprise, for example, by a service mapping instance 318. The datacenter 310 may include the service mapping instance 318 capable of communicating with the load balancer 312 as well application server instances 314A-314C and monitor network traffic between different devices and CIs. In certain cases, the datacenter 310 may also include a configuration management database (CIVIDB) 316, which stores configuration information, including hardware and software information, dependency information, asset management information, etc.

The load balancers allow for a single unified outward facing enterprise service to be supported by one or more devices, real or logical, in order to distribute service loads. Distribution of service loads helps maintain reliability of the enterprise service under load and allows a measure of redundancy in case of, for example, hardware failure. According to certain aspects, enterprises having multiple existing enterprise services may route these services through one or more load balancers and the load balancers may be used as a source of information for discovering enterprise service entry points. These entry points are properties of a connection to a CI and these entry points may be used as a starting point for service mapping. Common entry point attributes include host/hostname (including real, alias, internet protocol (IP) address, or virtual IP address), port number, service name, and uniform resource locator (URL) of the service. Once entry points are defined, service mapping may start the discovery and mapping process for the enterprise service from the entry point.

Figure 4:
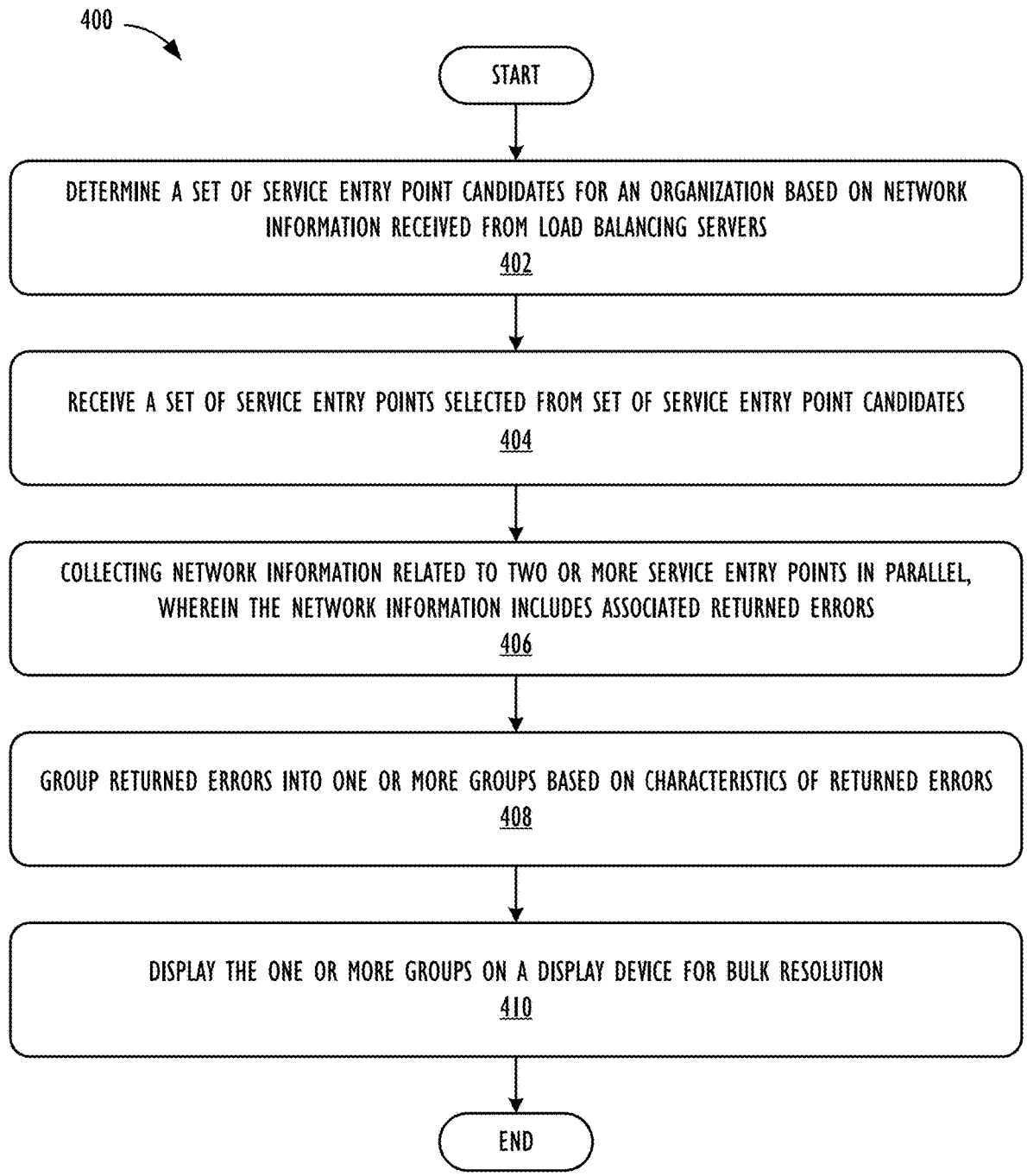
FIG. 4 is a flowchart of an embodiment of a method 400 for bulk mapping network services, in accordance with aspects of the present disclosure.

FIG. 4 is a flowchart of an embodiment of a method 400 for bulk mapping network services, in accordance with aspects of the present disclosure. The method 400 may be implemented, for example, by a computing device, such as any, or all, of applications server instances 210a-210d or a standalone service mapping instance. Embodiments described herein generally relate to cloud computing and in particular to bulk service mapping. At step 402, a set of service entry point candidates may be determined based, at least in part, on network information received from one or more load balancing servers. At step 404, a set of service entry points selected from the set of service entry point candidates are received from a user, for example an administrator or service mapping user. At step 406, network information related to at least two or more service entry points are collected in parallel. In certain cases, this network information may include information that may be used to create a service map for a particular enterprise service based on the associated service entry point candidate. In some cases, this network information may include any errors received or otherwise encountered while attempting to create a service map for the associated service entry point candidate. At step 408, errors in the network information may be grouped based on the characteristics of the error. According to certain aspects, these characteristics may include error codes, descriptions or the like and these characteristics may be used to group the errors into high level categories of errors selected to describe common errors and/or likelihood in which the errors are likely to be resolvable together via a common fix, such as a change in configurations or permissions. This grouping may be performed across multiple enterprise services. At step 410, the groups of errors are displayed to the user for bulk resolution. As an example, a group of errors of the grouped errors may be represented by a group category card, button, or UI element. Interacting with the grouped category card may display sub-groups of the group of errors represented by error cards.

A readiness check may be performed as a part of or prior to bulk service mapping to determine whether a particular cloud computing infrastructure and service mapping instance is prepared for bulk service mapping. For example, the readiness check may verify whether load balancers and mid servers have been discovered by a discovery process. The discovery process generally finds (e.g., obtaining network addresses, host information, and/or IP addresses) devices, such as computers, servers, printers, load balancers, and a variety of IP-enabled devices, along with the applications that run on these device, for a cloud computing infrastructure. Data collected by the discovery process may be stored in the CMDB. As an example the readiness check may verify that a discovered MID server is provisioned with the relevant applications, capabilities, and has IP ranges defined. Credentials may be checked to verify that the service mapping instance and other relevant services have certain credentials or permissions. Load balancers and hosts may be checked to verify that there are a sufficient number of load balancers and hosts for bulk service mapping to be performant and that discovery has occurred or refreshed within a certain number of days. Where there are less load balancers and hosts than necessary, bulk mapping may be less useful, for example, as there may not be enough server resources to absorb the load of bulk mapping or enough services to take advantage of bulk mapping useful. Status for services may also be checked. For example, the readiness checks may verify that netflow services have been configured on the router and that cloud discovery is configured on the MID server. According to certain aspects, an infrastructure may be determined to be ready for bulk service mapping if the readiness check determines that there is at least one MID server configured with a service mapping instance over an IP range, that the service mapping instance has at least one active credential, at least three operational load balancer discovered within the last two weeks, at least 100 hosts discovered within the last two weeks, a netflow connector is configured, active, and refreshed in the last day, and cloud discovery is configured, active, and refreshed in the last two weeks. Readiness issues may be surfaced when user interventions may be needed.

After the readiness checks, service entry point candidates may be determined based, at least in part, from the network information received from one or more load balancers. A service mapping instance may connect to a load balancer using standard protocols, such as simple network management protocol (SNMP), secure shell (SSH), etc. to obtain information related to the configuration of the load balancer. As an example, the service mapping instance may query the load balancer via SNMP to discover devices (such as servers, switches, routers, etc.) and host information. Network traffic data may also be used to determine service entry point candidates. For example, the service mapping instance may use network tools, such as netstat or Splunk on Splunk (S.o.S.), to obtain net flow or traffic data for the server the service mapping instance is running on. These network tools may return, for example, transmission control protocol (TCP) connections, routing tables, or other similar network traffic data.

Figure 5:
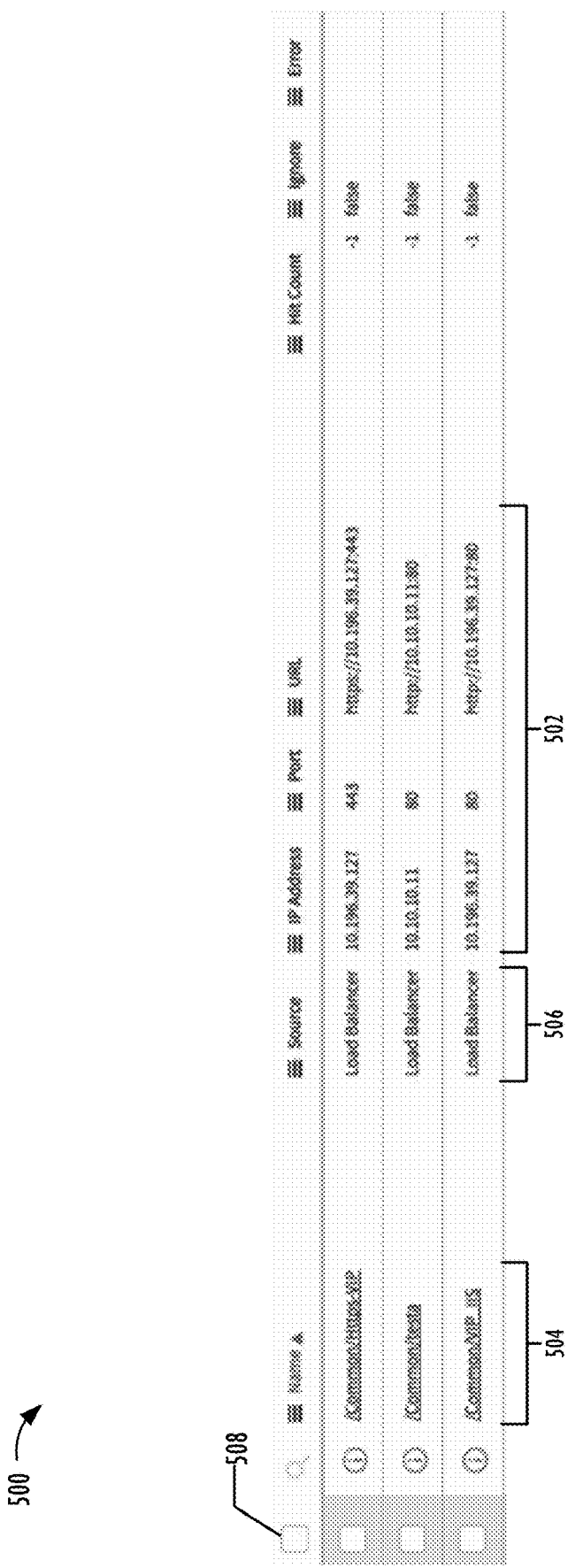
FIG. 5 illustrates an example service entry point candidates list user interface (UI) 500, in accordance with aspects of the present disclosure.

FIG. 5 illustrates an example service entry point candidates list user UI 500, in accordance with aspects of the present disclosure. After a set of service entry point candidates are determined, this set may be presented, for example, to the user in the service entry point candidates list UI 500. The service entry point candidates list UI 500 may include entry point attributes 502 related to the service entry point candidates 504, such as the host information, port number, URL, etc., along with source information 506. The source information 506 indicates how the enterprise service was discovered, such as through the load balancer or network flow data. The user may filter, sort, ignore and/or select specific discovered enterprise services to map. An option to select all, for example using a select all checkbox 508, or other similar UI element, of the service entry point candidates 504 may be provided. The service entry point candidates list UI 500 may also allow the service entry point candidates 504 to be edited, for example to add additional service entry point candidates individually or in groups, such as by importing a comma sorted values (.csv) file.

According to certain aspects, service maps may be generated on multiple selected service entry point candidates 504 in parallel. This parallelization may, for example, be performed using multiple threads, processes, or instances, either of the service mapping process or directed by the service mapping process. In certain cases, the service mapping process may process multiple service entry point candidate as background processes and notify the user when the processing of the service entry point candidates are complete.

For a selected service entry point, a discovery process may be run to identify the host and a mapping procedure to map applications running on the host. A service entry point generally represents a point of access for an application CI. For the discovery process, the service mapping instance may check the CMDB to determine if a device hosting the application CI exists. If the device does not exist, the service mapping instance may probe, via the MID server, the host URL or ports to identify the host and update the CMDB. Once a host is found in the CMDB, the service mapping process discovers the applications running on the host. This may be performed in several ways. Two methods of discovery include pattern matching and network monitoring. Pattern matching may include analysis of applications and their configuration files. To perform pattern matching domain specific knowledge may be required to know how to parse configuration files so as to identify the desired information. Network monitoring includes analysis of network traffic between different CIs within a given network. By analyzing how CIs communicate with each other it can be possible to identify dependencies of CIs on each other and make educated guesses to build a service map.

Figure 6:
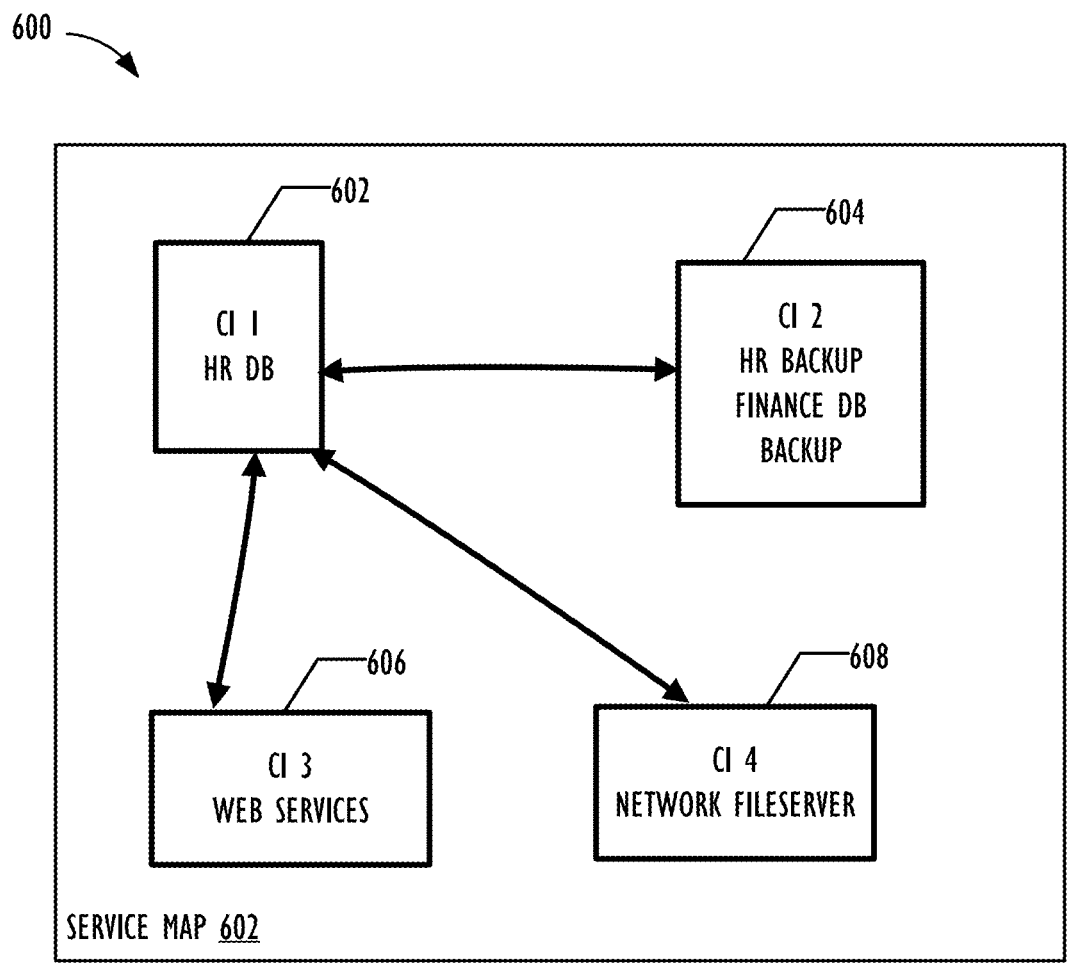
FIG. 6 is a block diagram 600 illustrating a service map, in accordance with aspects of the present disclosure.

FIG. 6 is a block diagram 600 illustrating a service map connecting CIs associated with a Human Resources (HR) portal function, in accordance with aspects of the present disclosure. This HR portal may, for example, be a web based interface where employees could interact with HR for benefits information. CI 1 602 represents a primary HR database server. CI 2 604 represents a backup database server that is configured to perform backup functions for both the HR database and a finance department database. CI 3 606 represents a web services server supporting the HR portal function. CI 4 608 represents a network fileserver containing information pertinent to the HR portal function.

Figure 7:
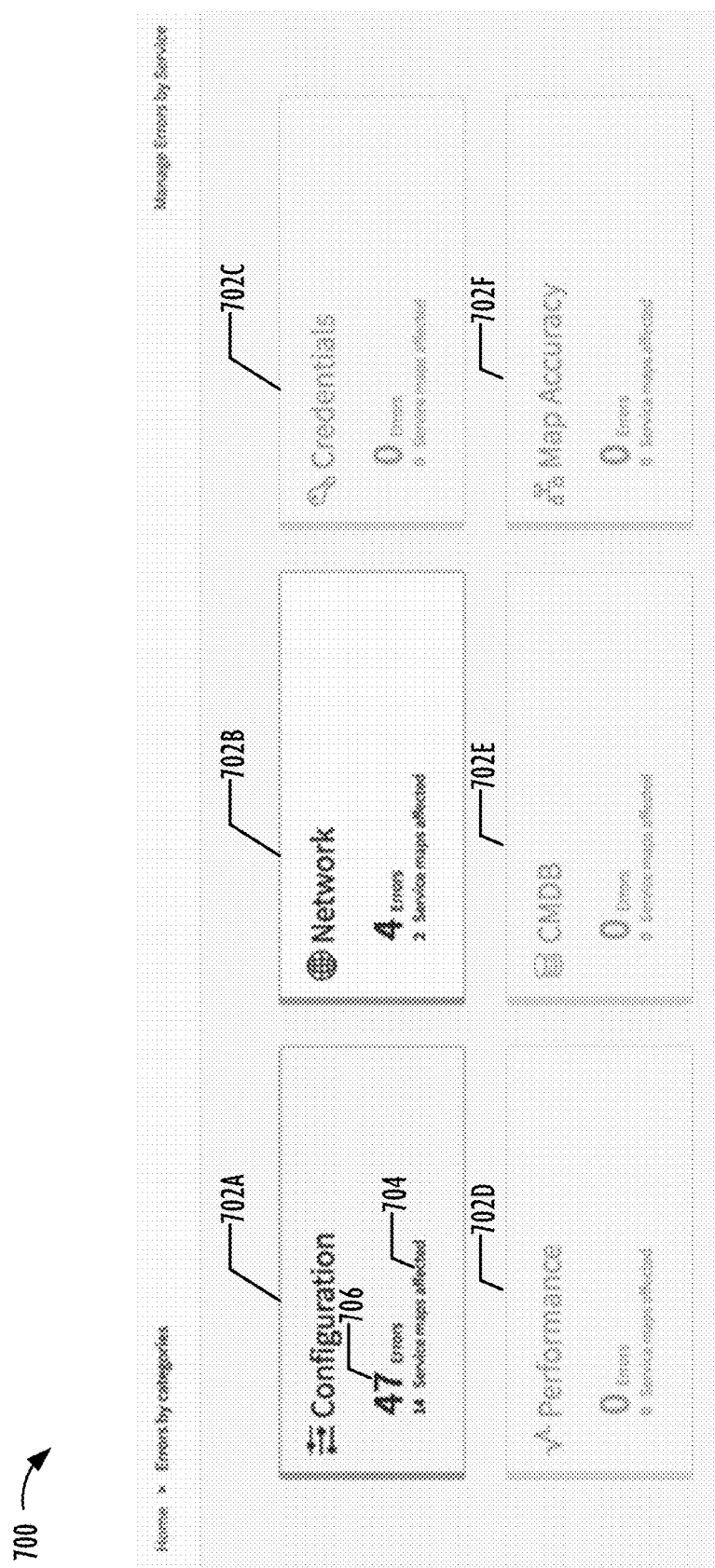
FIG. 7 illustrates an example bulk error resolution UI 700, in accordance with aspects of the present disclosure.

According to certain aspects, the errors may be encountered while attempting to create a service map for one or more service entry point candidates. These errors may be categorized into category groups based on the characteristics of the error across multiple service entry point candidates. For example, authentication errors and user errors may be grouped together in a single category group as the errors are related to credential issues and may be resolved together, for example, by propagating a service mapping user as needed with a particular set of permissions. In certain cases, these categories provide a meaningful flow and indicate a level of impact on services. FIG. 7 illustrates an example bulk error resolution UI 700, in accordance with aspects of the present disclosure. In certain cases, the user may be able to switch between a UI view which details errors based on specific enterprise services and the bulk error resolution UI 700. The bulk error resolution UI 700 may categorize errors into category group cards 702A-F (collectively 702), which represent groups of errors. This example includes six category group cards, here configuration card 702A, network card 702B, credentials card 702C, performance card 702D, CMDB card 702E, and map accuracy card 702F. Each category group card 702 refers to a particular problem category and includes an indication 704 of how many enterprise services may be impacted by the problem category and a total number of errors 706 in the category. Generally, the configuration card 702A includes errors related to, for example, configuration issues, such as issues with the MID server, stale discovery data, etc. The network card 702B includes errors related to, for example, network traffic forwarding, network address translation, etc. The credentials card 702C includes errors related to, for example, missing or incorrect credentials. The performance card 702D includes errors related to, for example, timeouts or other performance related issues. The CMDB card 702E includes errors related to, for example, irregularities in the CMDB, missing rules and patterns, etc. The map accuracy card 702F includes errors related to, for example, service maps that, while not necessarily associated with an explicit error, are determined to be partial maps or unlikely to be accurate. This determination may be based, at least in part, on service map patterns which are known to be unlikely to be useful or that are nonsensical. For example, service maps missing a database or having a load balancer without outgoing connections may be technically correct in that no explicit error is encountered during mapping, but would likely not represent an accurate or even workable enterprise service. Service mapping patterns that are likely inaccurate or nonsensical may be predefined, for example, based on patterns known to be not useful or likely. By checking generated service maps for instances where the map is unlikely to be accurate or is nonsensical, the map accuracy error card, along with the other errors cards, help guide the user to quickly resolve issues that may be blocking multiple service maps without having to manually go through each service map. For example, multiple map accuracy errors indicating a common load balancer missing out-bound connections may guide the user to troubleshoot and fix the load balancer and resolve multiple mapping errors.

Category group cards 702 may also include error status information based on the underlying errors of the group. For example, status information may also indicate that the category group is in discovery. A category group may be in discover while mapping is still being performed or where a rediscover all has been initiated on the group, such as to verify a corrective action after the corrective action was taken. Status information may also include a comment which may be assigned to the group, for example, by the user. Status information may also indicate that active errors are present and that no corrective actions have been taken on those errors. Generally category group cards may display a single status information for the group. For example, if a rediscovery operation is still in progress, the in discovery status information may be displayed in the card even if new active errors have been found.

Errors may be resolved by drilling down into a particular category group card by clicking on the particular category group card. A list of the errors in the group associated with the particular category group card may be displayed. In certain cases, the list of errors may be arranged into subgroups of the category group of errors and each subgroup represented by an error card. The subgroups may be based on a specific type of error of the group of errors. For example, invalid user errors and insufficient permission errors may be grouped into separate subgroups.

Figure 8:
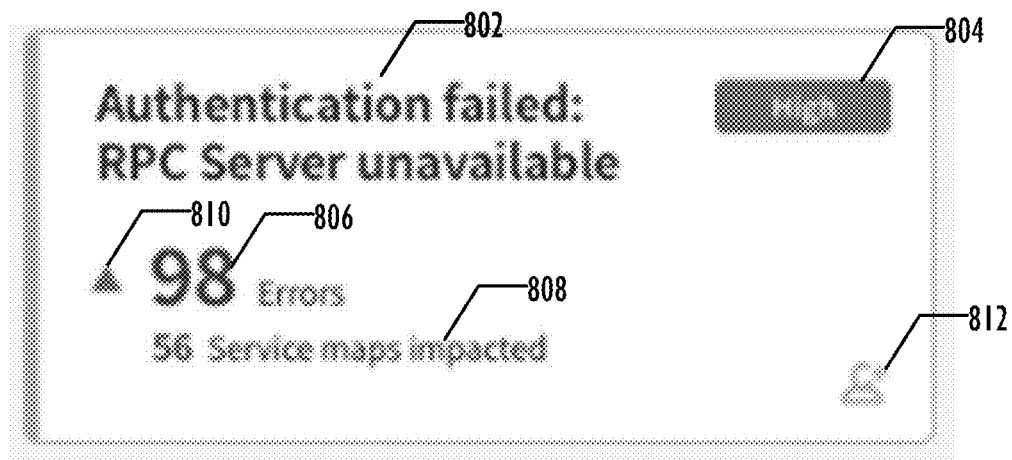
FIG. 8 illustrates an example error card 800, in accordance with aspects of the present disclosure.

FIG. 8 illustrates an example error card 800, in accordance with aspects of the present disclosure. Generally, error card 800 may represent a particular error of the category group and may represent multiple errors associated with multiple organization services. Errors may include error attributes, which may be displayed on the error card 800. Examples of error attributes include a name 802 of the error, a priority 804 (e.g., High/medium/low) associated with the error, a total number of active errors 806, a total number of impacted service maps or organization services 808, an arrow 810 indicating a total number of errors relative to the last hour, and an error status 812. The error status 812 may indicate whether a particular error subgroup contains active errors, is in discovery, or has been assigned. The priority 804 may represent a percentage of organization services impacted by the error out of the total number of organization services. The error cards may be, in certain cases, sorted based on priority of the error cards. Error cards may also indicate the priority of the associated errors in broad categories. According to certain aspects, error cards that identify errors which affect the most number of services or errors that affect the most vital services may be considered high priority error cards. For example, a high priority error card may indicate that the error affects more than 50% of the total number of organization services, medium priority between 20% to 50%, and low between none and 20% of the total number of organization services.

Actions may be recommended to resolve certain error cards and these actions may be performed as against a single error, multiple selected errors or error cards, or all error cards. Recommended actions may include internal actions, which may be performed within the service mapping UI, such as creating new credentials or changing MID server IP ranges. Other recommended actions may be external, which may include actions that need to be performed outside of the service mapping UI, such as installing a new MID server, or opening forwarding ports, etc. In certain cases, recommended actions may also include best practice recommendations which are recommended, but optional. Errors may also be flagged to be ignored or rediscovery may be run for selected error cards. For internal actions, rediscovery may be automatically run after the recommended action is applied. For error resolution using recommended external actions, a list of options for pushing the this task to external resources be displayed, such as exporting a file with the task and sending the file as an email attachment, opening a task or a task application for a user, or marking the external task as resolved.

Figure 9:
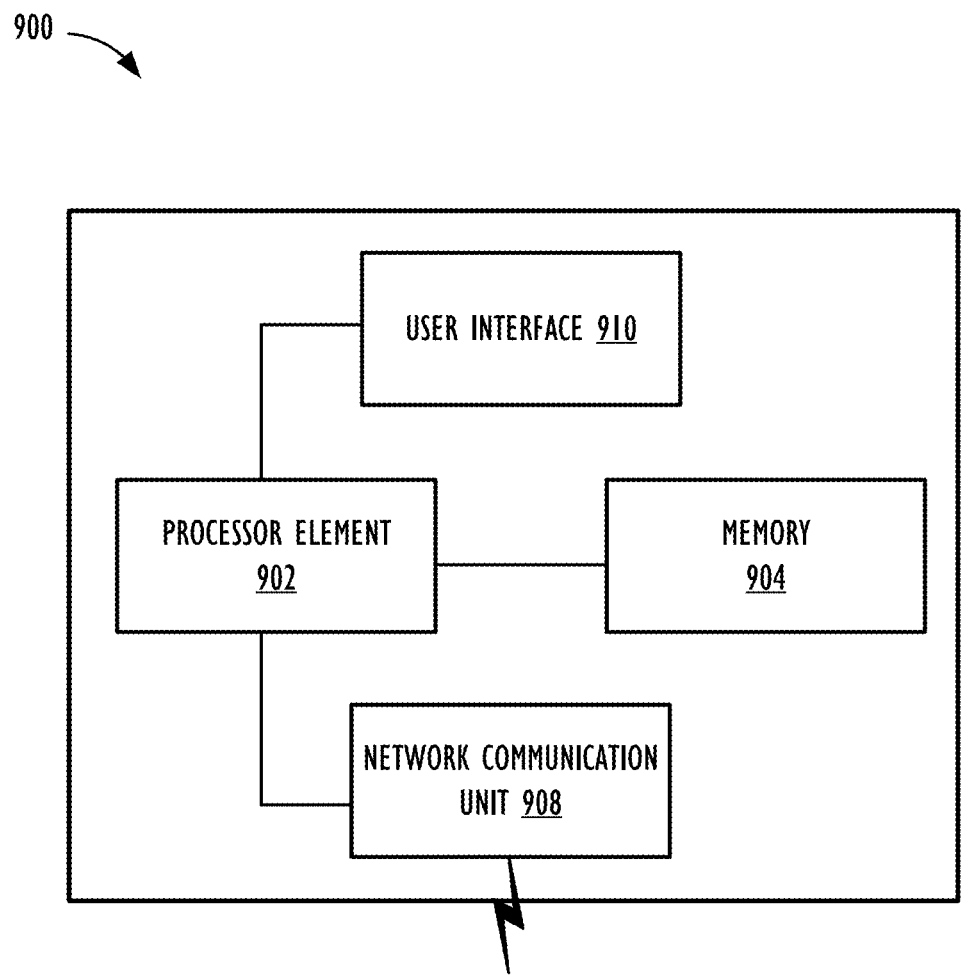
FIG. 9 is a block diagram illustrating another embodiment of computing device 900 for use with techniques described herein.

Referring now to FIG. 9, a block diagram illustrates a computing device 900 that may be used for implementing the techniques described herein in accordance with one or more embodiments (e.g., MID server 304, load balancer 312, CMDB 316, service mapping instance 318, and application server instance 314 and method 400). For example, the computing device 900 illustrated in FIG. 9 could represent a client device or a physical server device. As shown in FIG. 9, the computing device 900 can include can also include one or more input/output devices, such as a network communication unit 908 that could include a wired communication component and/or a wireless communications component, which can be coupled to processing element 902. The network communication unit 908 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi®, and/or other communication methods.

The computing device 900 includes a processing element 902 that contains one or more hardware processors, where each hardware processor may have a single or multiple processor cores. In one embodiment, the processing element 902 may include at least one shared cache that store data (e.g., computing instructions) that are utilized by one or more other components of processing element 902. For example, the shared cache may be locally cache data stored in a memory for faster access by components of the processing elements 902. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 9, the processing element 902 may also include one or more other types of hardware processing components, such as graphics processing units (GPU), application specific integrated circuits (ASICs), field-programmable gate arrays (FPGAs), and/or digital signal processors (DSPs).

FIG. 9 illustrates that memory 904 may be operatively coupled to processing element 902. Memory 904 may be a non-transitory medium configured to store various types of data. For example, memory 904 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 902. In one embodiment, the compiling process of the software program may transform program code written in a programming language to another computer language such that the processing element 902 is able to execute the programming code. For example, the compiling process of the software program may generate an executable program that provides encoded instructions (e.g., machine code instructions) for processor 902 to accomplish specific, non-generic, particular computing functions.

After the compiling process, the encoded instructions may then be loaded as computer executable instructions or process steps to processing element 902 from storage (e.g., memory 904) and/or embedded within the processing element 902 (e.g., cache). Processing element 902 can execute the stored instructions or process steps in order to perform instructions or process steps to transform the computing device into a non-generic, particular, specially programmed machine or apparatus. Stored data, e.g., data stored by a storage device, can be accessed by processing element 902 during the execution of computer executable instructions or process steps to instruct one or more components within the computing device 900.

A user interface 910 can include a display, positional input device (such as a mouse, touchpad, touchscreen, or the like), keyboard, or other forms of user input and output devices. The user interface 910 can be coupled to processor element 902. Other output devices that permit a user to program or otherwise use the computing device can be provided in addition to or as an alternative to network communication unit 908. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9. For ease of discussion, FIG. 9 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system for mapping network services, comprising:
    one or more non-transitory memory devices; and
    one or more hardware processors configured to execute instructions from the one or more non-transitory memory devicesto cause the system to:
        determine a set of service entry point candidates for an organization based, at least in part, on first network information, wherein each service entry point candidate of the set of service entry point candidates comprises a property of a connection to a configuration item, and the first network information comprises networktraffic between a set of components represented by configuration items;
        receive user input including a selection of a set of service entry points selected from the set of service entry point candidates;
        initiate network discovery from the selected set of service entry points to collect second network information related to two or more service entry points of the set of service entry points, wherein the second network information is indicative of one or more devices connected to a computing network and one or more applications running on the one or more devices;
        generate a service map based on the second network information;
        identify errors associated with one or more service entry points of the set of service entry points in the second network information based on a determination that the service map is not accurate via comparison of patterns of the service map with predefined inaccurate patterns;
        group the errors into one or more category groups based on characteristics of the errors; and
        display the one or more category groups on a display device.

2. The system of claim 1, wherein the one or more hardware processors are configured to execute instructions to cause the system to determine network location information forone or more load balancing servers for the organization.

3. The system of claim 1, wherein the first network information comprises a pattern matching analysis for a first service entry point of the two or more service entry points.

4. The system of claim 1, wherein the first network information is received from one or more load balancing servers.

5. The system of claim 1, wherein the one or more hardware processors are configured to execute instructions to cause the system to:
    receive input selecting a category group of the one or more category groups; and
    display an error card, the error card representing errors associated with two or more service entry point candidates.

6. The system of claim 5, wherein the error card includes a representation of a priority associated with the errors represented by the error card.

7. A method for mapping network services, comprising:
    determining a set of service entry point candidates for an organization based, at least in part, on first network information comprising network traffic between a set of components represented by configuration items;
    receiving userinput including a selection of a set of service entry points selected from the set of service entry point candidates, wherein each service entry point candidate of the set of service entry point candidates comprises a property of a connection to a configuration item;
    initiating network discovery from the selected set of service entry points to collect second network information related to two or more service entry points of the set of service entry points, wherein the second network information is indicative of one or more devices connected to a computing network and one or more applications running on the one or more devices;
    generating a service map based on the second network information;
    identifying errors associated with one or more service entry points of the set of service entry points in the second network information based on a determination that the service map is not accurate via comparison of patterns of the service map with predefined inaccurate patterns;
    grouping the errors into one or more category groups based on characteristics of the errors; and
    displaying the one or more category groups on a display device.

8. The method of claim 7, comprising generatingthe service map for the organization based in part on a pattern matching analysis for a first service entry point of the two or more service entry points.

9. The method of claim 8, comprising:
    analyzing network traffic between two or more configuration items based on the two or more service entry points, wherein the network traffic is received from one or more load balancing servers; and
    generatingthe service map for the organization based in part on the analysis of network traffic.

10. The method of claim 7, comprising:
    receiving input selecting a category group of the one or more category groups; and
    displaying an error card, the error card representing errors associated with two or more service entry point candidates.

11. A non-transitory computer readable medium containing instructions that, when executed by a processor causes a programmable device to:
    determine a set of service entry point candidates for an organization based, at least in part, on first network information, wherein each service entry point candidate of the set of service entry point candidates comprises a property of a connection to a configuration item, wherein network discovery may start from any of the service entry point candidates, and the first network information comprises network traffic between a set of components represented by configuration items;

receive user input including a selection of a set of service entry points selected from the set of service entry point candidates;

initiate network discovery from the selected set of service entry points to collect second network information related to two or more service entry points of the set of service entry points, wherein the second network information is indicative of one or more devices connected to a computing network and one or more applications running on the one or more devices;

generate a service map based on the second network information;

identify errors associated with one or more service entry points of the set of service entry points in the second network information based on a determination that the service map is not accurate via comparison of patterns of the service map with predefined inaccurate patterns;

group the errors into one or more category groups based on characteristics of the errors; and displaythe one or more category groups on a display device.

12. The system of claim 1, wherein an attribute of each service entry point candidate of the set of service entry point candidates comprises a host, a hostname, a port number, a service name, a uniform resource locator, or any combination thereof.

13. The system of claim 1, wherein the one or more category groups comprise a configuration error group, a network error group, a credential error group, a performance error group, a database error group, a map accuracy error group, or any combination thereof.

14. The system if claim 1, wherein the one or more hardware processors are configured to execute instructions to cause the system to receive an input to resolve the returned errors for at least one of the one or more category groups.

15. The method of claim 10, wherein the error card comprises a recommended action to resolve one or more of the errors associated with the two or more service entry points.

16. The method of claim 15, wherein the recommended action comprises an internal action to be performed via the userinterface, an external action to be performed outside of the userinterface, or both.

17. The method of claim 15, comprising initiating network rediscovery after the recommended action has been applied.

18. The method of claim 15, wherein the recommended action comprises creating new credential, providing a set of permissions, changing a server Internet Protocol range, installing a new server, opening a forwarding port, blocking other service maps, troubleshootingthe one or more load balancers, exporting a file, opening a task application, or any combination thereof.

* * * * *